F. W. OFELDT.
VALVE GEAR.
APPLICATION FILED MAY 8, 1916.

1,238,559.

Patented Aug. 28, 1917.
6 SHEETS—SHEET 1.

Witnesses
Inventor
Francis W Ofeldt
By his Attorney

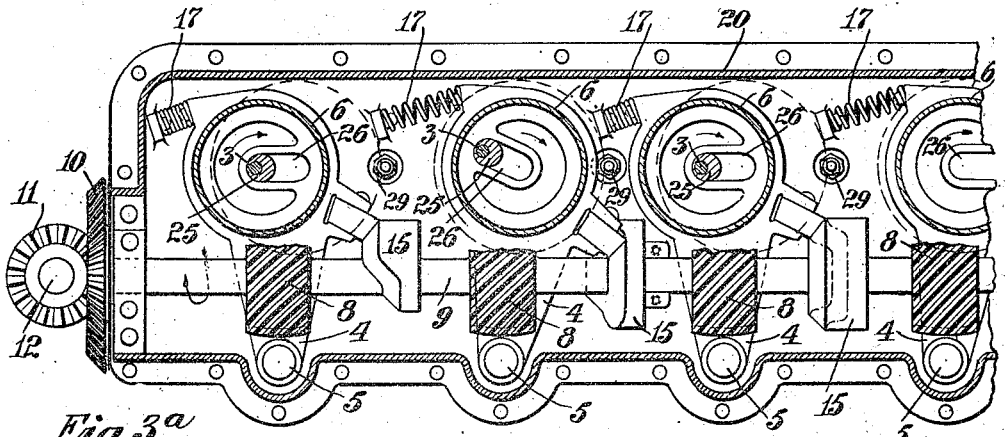

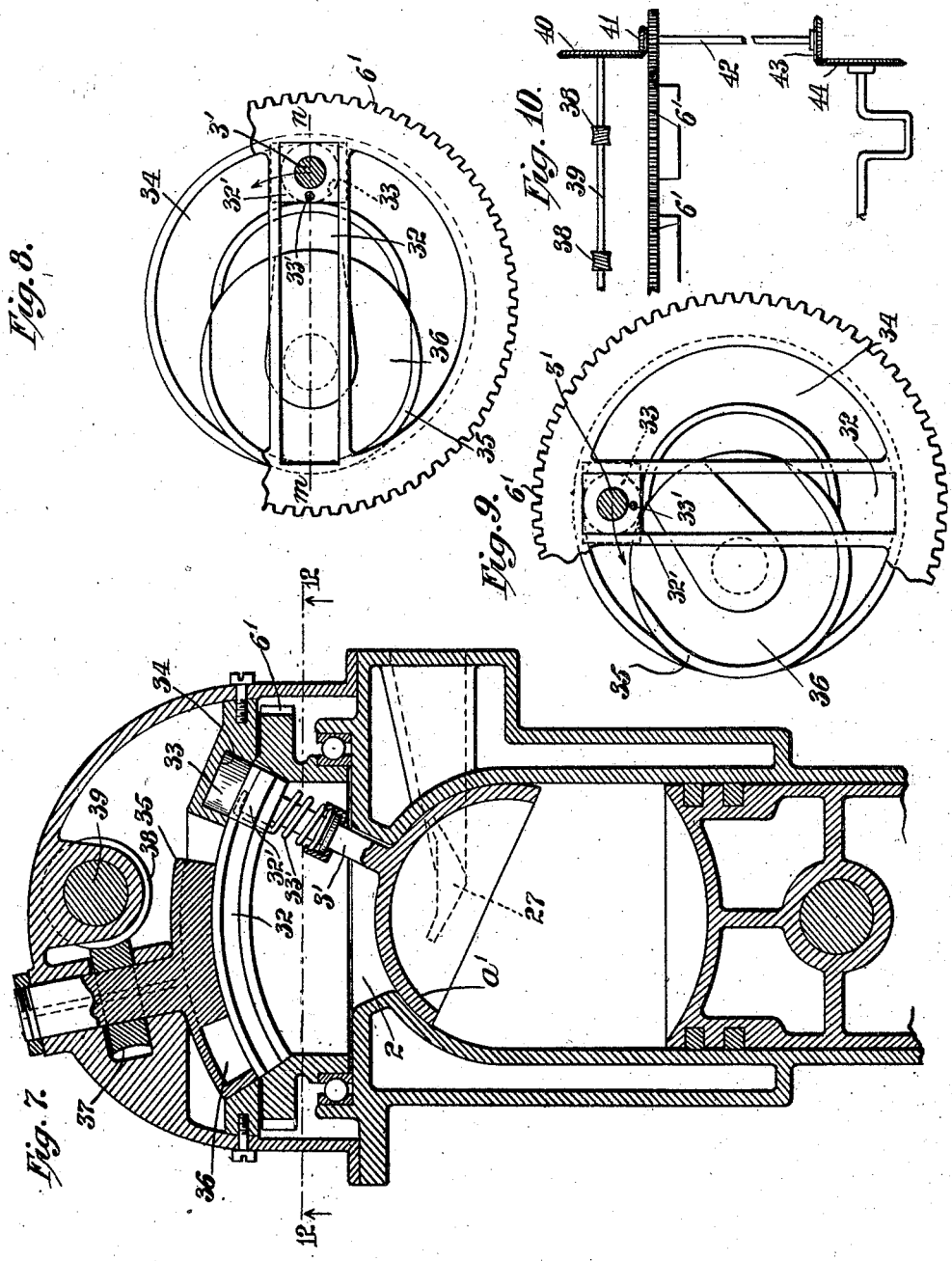

F. W. OFELDT.
VALVE GEAR.
APPLICATION FILED MAY 8, 1916.

1,238,559.

Patented Aug. 28, 1917.
6 SHEETS—SHEET 4.

Attest:

Inventor:
Frank W. Ofeldt
by
H. M. Marble Atty

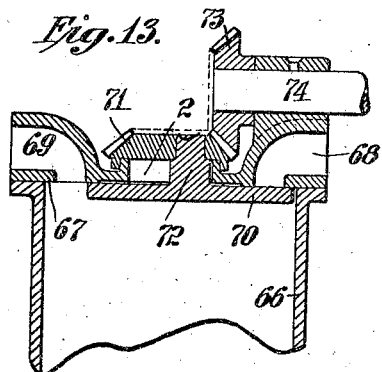
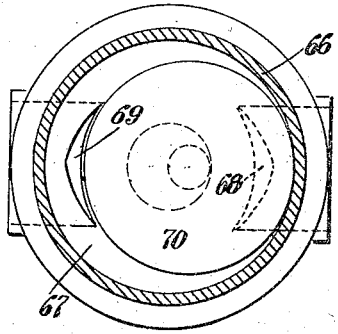
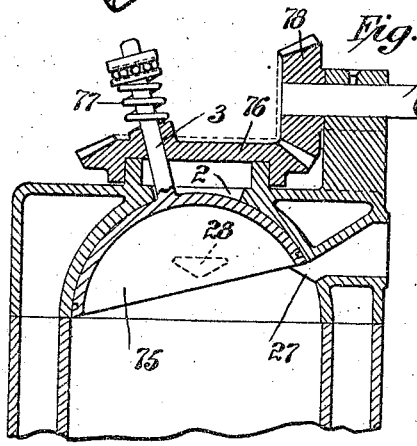
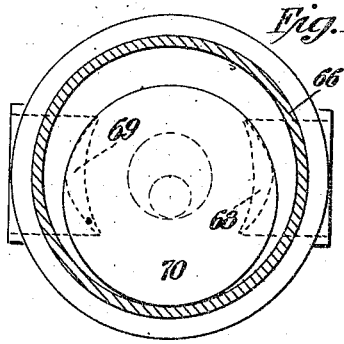
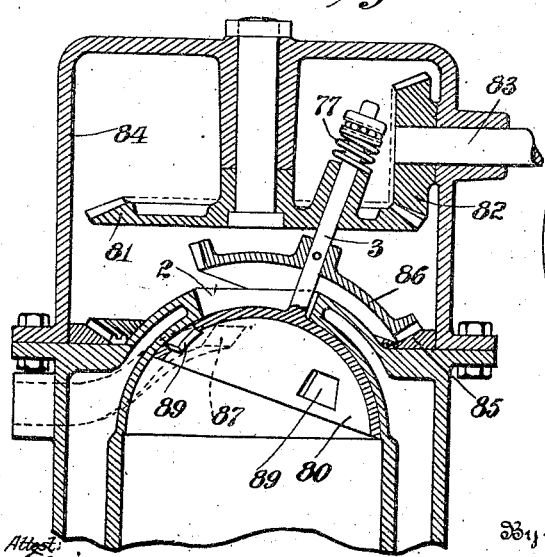
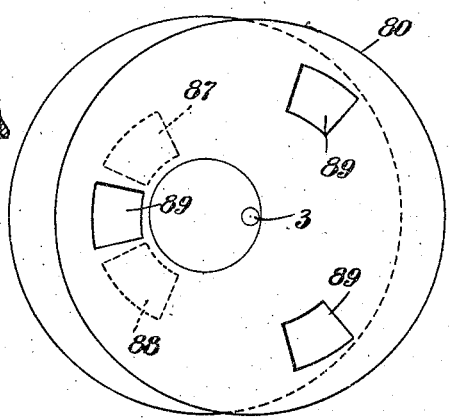

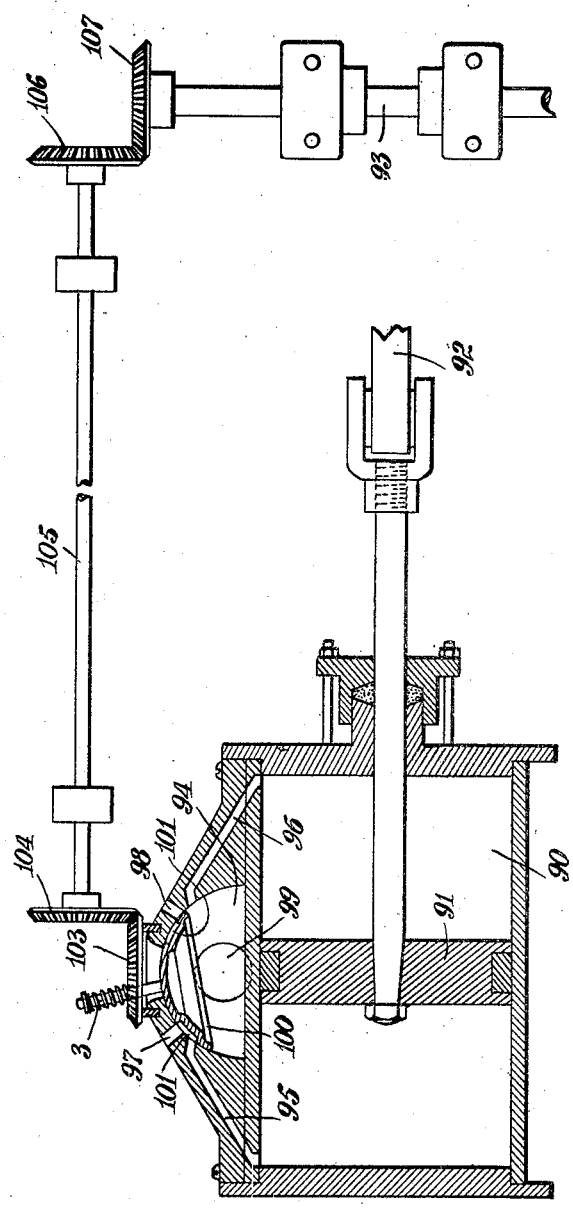

UNITED STATES PATENT OFFICE.

FRANK W. OFELDT, OF JERSEY CITY, NEW JERSEY, ASSIGNOR TO O. & B. COMPANY, OF DRAVOSBURG, PENNSYLVANIA, A CORPORATION OF DELAWARE.

VALVE-GEAR.

1,238,559.   Specification of Letters Patent.   Patented Aug. 28, 1917.

Application filed May 8, 1916. Serial No. 95,996.

*To all whom it may concern:*

Be it known that I, FRANK W. OFELDT, a citizen of the United States of America, and a resident of Jersey City, county of Hudson, and State of New Jersey, have invented certain new and useful Improvements in Valve-Gear, of which the following is a specification.

My invention relates to improvements in valve gear, the improved valve gear herein illustrated and described being primarily intended for internal combustion engines, particularly internal combustion engines of the four-cycle type; although my invention is applicable also to valve gear for two-cycle engines, steam and compressed air engines and the like, compressors, pumps, and other machines in which valve gear of a nature analogous to valve gear of internal combustion engines, steam engines, compressors, pumps, etc., are employed. In the valve gear herein illustrated and described, a valve or valves, located either inside or outside of the cylinder or like member in connection with which the valve coacts, (which valve is usually, though not necessarily, of a hemispherical form,) is given a motion which may be best described as a "gyratory" motion; *i. e.*, a motion which is not a rotary motion, nor is it an oscillatory motion, but rather a wabbling motion, wherein the axis of the valve describes a circle or other closed curve without rotation. In addition, preferably, the valve has a slow rotary motion, quite independent of the wabbling or gyratory motion above referred to, and not at all necessarily incident to the performance of the port-opening and port-closing action of the valve, but rather a motion which serves to equalize the wear, if any, of the valve, and of its seat, as well as to distribute any heating effect to which the valve may be subject due to the passage of heated fluid through the port or ports guarded by the valve. My invention consists in the combination, with such a valve, of means for imparting to it the peculiar motions above stated; in the novel relation of the valve with respect to its cylinder or other member with which the valve coacts; in the novel mechanism provided for driving the valve; and in various other features, as hereinafter described and particularly pointed out in the appended claims.

The objects of my invention are to improve and simplify valve gear, particularly valve gear of internal combustion engines; to provide a valve and valve gear which shall close and open its port or ports positively and shall be capable of so doing at very high engine speed and which shall not require lifting from its seat during the performance of its valve functions, nor shall it be difficult of lubrication or subject to material wear during long periods of use; to provide a valve and valve gear wherein port opening and port closure shall be rapid with large port area open during the open period; to provide a valve gear which shall be absolutely silent in operation; to avoid material motion of the valve while exposed to great pressure; to provide valve operating mechanism which shall move the valve smoothly and with gradual acceleration and retardation when change of rate of movement occurs; to provide for efficient cooling of the valve; to provide for efficient lubrication of the valve; and generally to provide a type of valve and valve gear readily adaptable to existing types of engines and which shall be compact, neat in appearance, durable and reliable.

I will now proceed to describe my invention with reference to the accompanying drawings, and will then point out the novel features in claims. In said drawings:

Fig. 3 shows a horizontal section taken on the irregular section line 3—3 of Fig. 4.

Fig. 3ª is a fragmentary detail elevation of mechanism for driving the cam shaft from the crank shaft of the engine.

Figure 1:
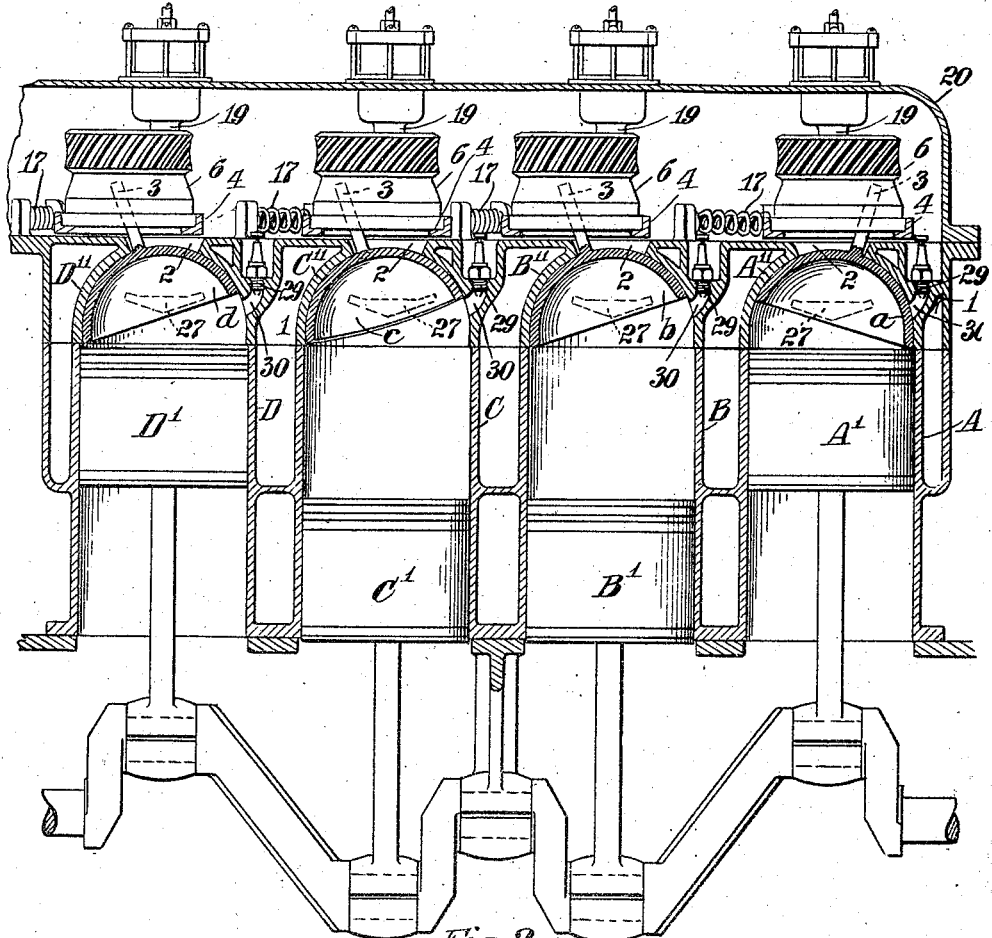
Figure 1 shows a central vertical longitudinal section of a four-cylinder internal combustion engine provided with my improved valve gear, features of the engine unessential to the understanding of the present invention being omitted.

Fig. 4 shows a vertical transverse section of one of the cylinders of the engine shown in Figs. 1 and 3, and of the valve gear for that cylinder.

Fig. 5 is an end elevation, and Fig. 6 a longitudinal section, of one of the gear-vibrating cams of the valve gear illustrated in the previous figures.

Fig. 7 shows a central vertical section of the cylinder, cylinder head and associated parts, of an engine having an alternative form of valve gear embodying a rotatable valve-driving member having a transverse track for the valve stem in connection with a stationary member having a circumferential track for the valve stem and a rotary gate intersecting such circumferential track and itself having a track for the valve stem; by the coaction of which members the valve is given a gyratory motion through paths of two different diameters during each complete cycle.

Figs. 8 and 9 show the two track-members and the gate from below, and show the gate in two different positions; these views being diagrammatic to the extent that the tracks 32 and 34 are assumed for purpose of illustration to be plane, in order to avoid the complications of illustration incident to showing warped members; and Fig. 10 is a diagram illustrating the drive of the rotary members of this valve gear.

Figure 12:
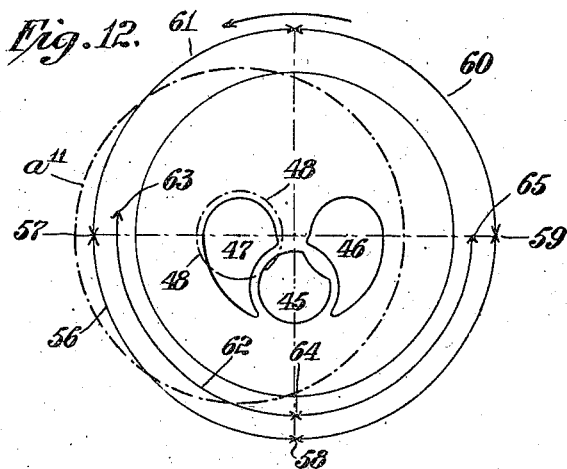
Figure 11:
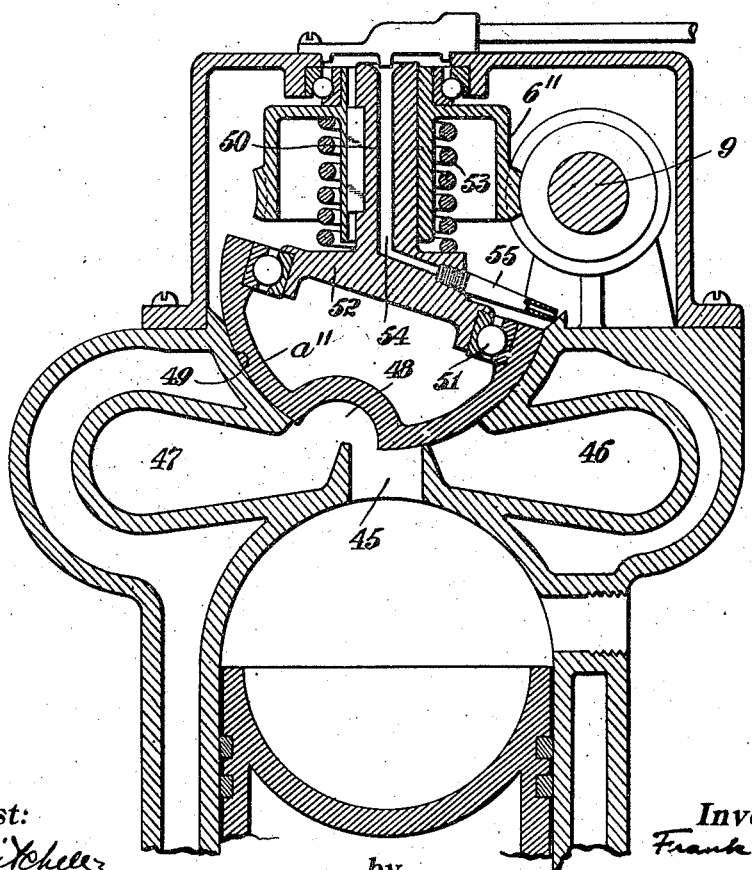

Fig. 11 shows a central vertical section of the cylinders, cylinder head, valve and associated parts of a further alternative form of valve gear, wherein the valve is located in a recess in the exterior surface of the cylinder head and, while it has a gyratory motion, acts somewhat like an ordinary D valve; and Fig. 12 is a diagram illustrative of the action of the valve of Fig. 11.

Fig. 13 shows a fragmentary central vertical section of the upper portion of an engine cylinder provided with a flat gyratory valve; and construction shown being particularly suitable for a steam or compressed air engine or a compressor or pump.

Fig. 14 shows a view from below of the cylinder head and valve, the valve being shown in position to close the inlet port and open the exhaust port;

Fig. 15 is a view similar to Fig. 14 except that the valve is shown in position to close both inlet and exhaust ports.

Fig. 16 is a fragmentary central vertical section of the upper portion of the cylinder of a four cycle engine fitted with a gyratory valve which is operated at half crank shaft speed, but without means, such as shown in Figs. 1–4 inclusive, for holding the valve stationary during a portion of the cycle; the inlet and exhaust ports being therefore 90° apart.

Fig. 17 is a fragmentary central vertical section of the upper portion of a four cycle engine cylinder provided with a gyratory valve and with positive means for rotating that valve during its gyration; and Fig. 18 shows an inverted horizontal section of the engine cylinder illustrating the positions of the parts of the cylinder and valve.

Fig. 19 shows a central horizontal section of a steam engine provided with a gyratory valve controlling both admission and exhaust.

Referring first to Figs. 1–6 inclusive:

In Fig. 1, A, B, C and D designate the engine cylinders of a four-cylinder engine, A', B', C' and D' the corresponding pistons, A'', B'', C'' and D'' the corresponding cylinder heads, and $a$, $b$, $c$ and $d$ the corresponding valves; in the particular construction illustrated the cylinders A–D inclusive are shown as of the familiar *en bloc* construction, and the same is true of the cylinder heads; but this of course is immaterial. The engine is shown as provided with the usual water jacket space 1, surrounding the upper portions of the engine cylinders and the combustion spaces within the cylinder heads.

The inner walls of the cylinder heads are of spherical curvature, and the corresponding exterior or working surfaces of the valves $a$—$d$ inclusive, are of corresponding curvature. In the top of each cylinder head there is an opening 2, through which projects a stem 3 of the corresponding valve.

Referring now particularly to Figs. 3, 3ᵃ and 4: For giving to the valves the gyratory or wabbling motion above described there is provided, for each valve, an arm 4 connected by a pivot 5 to the cylinder-head structure, and carrying a ring gear member 6, arranged to rotate with respect to said arm 4; ball bearings 7 for the ring gear being provided in the construction shown. These gears 6, in the construction shown, are of the helical type, being actuated by corresponding screw gears 8 on a cam shaft 9, itself driven in any suitable manner from the crank shaft of the engine, as, for example, by the bevel gears 10 and 11 and vertical shaft 12, itself driven from the crank shaft of the engine by other bevel gears 13 and 14. The cam shaft 9 is also provided, for each such arm 4, with a cam 15, itself shown more clearly in Figs. 5 and 6, the beveled face of which cam acts upon an antifriction roller 16 carried by the corresponding arm 4. It will be seen that as the shaft 9 rotates each cam 15 will, at a proper time, force the corresponding arm 4 to the left (as the parts are viewed in Fig. 3) against the pressure of a spring 17; and that later in each cycle of operations such cam will permit the return of the arm 4 by its spring 17. Owing to the shape of gears 6 and 8, such motion of the arm 4, and corresponding motion of its helical gear 6, takes place without loss of engagement of such gear 6 with its corresponding gear 8, and without change in relation of the pitch points of such gears.

Within the open center of each gear 6 there is a vertical rotary shaft 18, located within a stationary member 19 of the valve gear cover 20, such shaft 18 having suitable bearings 21, being acted upon by a suitable spring 22 which holds the valve against its seat, and having at its lower end a crank arm 23, through an oblique bore of which passes loosely the stem 3 of the corresponding valve; such stem having a ball race 24, and the upper surface of the crank arm 23 having a corresponding ball race, bearing balls being provided between these two ball races.

It will be apparent that as the cam shaft rotates its rotation will be communicated, through the gear 8, to gear 6, and this gear 6 in rotating will carry around with it the corresponding valve stem 3, and therefore the valve $a$, $b$, etc., of which that stem forms a part, since the crank pin 25 of the crank arm 23 is mounted in a slot 26 of the gear 6. It will also be noted that while the valve stem 3 travels around in a circular path, the motion it imparts to the valve itself is a wabbling or gyratory motion, rather than a motion of rotation. However, there is a slow rotation of the valve itself (a rotation which is backward with reference to the progress of the valve stem through its path of motion) due to the fact that, the valve being always tipped to one side, there is a greater area of valve, on one side of the axis, exposed to friction against the seat of the valve, than on the other side of the axis; a large portion of the valve surface on such other side of the axis being opposite the opening 2 of the cylinder head. From this slow bodily rotation of the valve it follows that different portions of the edge of the valve are exposed to the exhaust gases during different exhaust periods, and therefore overheating of the valve is avoided.

Referring to Fig. 4 it will be noted that the cylinder head is provided with an admission port 27 and with an exhaust port 28. Of course the exhaust ports are in front of the plane of section of Fig. 1, but the admission ports are shown in dotted lines in Fig. 1, and the exhaust ports are directly opposite and are of similar form. It will be apparent that as each valve gyrates it will first open its corresponding admission port, hold it open for a time, and then close it; and both admission and exhaust ports of that cylinder should remain closed during the ensuing compression and combustion periods, the valve opening the exhaust port at the end of the combustion period or stroke. In Fig. 1 valve $a$ is shown as just beginning to open the corresponding admission port; valve $b$ is shown as just having closed the corresponding admission port; valve $c$ is shown in position to open the exhaust port slightly, the valve moving in the direction to open that port more widely; and valve $d$ is shown in position to close both admission and exhaust ports. It is desirable that the valves shall not move materially during the compression and combustion periods; which are the periods in the operation of the engine when the valve is exposed to considerable pressure, and therefore, would require considerable power to move it. To the end that the valves may remain stationary during the compression and combustion periods, I have provided the cams 15 above mentioned and have mounted the gears 6 on the swinging arms 4. At the end of each admission period, in an engine cylinder, after the valve has closed the admission port of that cylinder, the corresponding cam 15 forces the corresponding arm 4 to the left (as the parts are viewed in Fig. 3) causing the corresponding ring-gear 6 to move until the corresponding crank pin 25 is at the center of the gear. Motion of the valve actuated by that crank pin therefore necessarily ceases until, after further rotation of such eccentric, the arm 4 is permitted to carry the gear back to first position under influence of the spring 17. By this means I not only retain the valves stationary during the periods of operation when they are exposed to much pressure, but I also obtain very large port opening. This follows from the fact that the ratio of gears 6 and 8, is two to one, shaft 9 being driven at half crank shaft speed, and the gears 6, therefore, being driven at full crank shaft speed. It will readily be seen that with the gear 6 rotating at full crank shaft speed, it is only by arranging to keep the corresponding valves stationary during compression and combustion periods that correct timing of the valves is obtained in a four-cycle engine.

Figure 2:
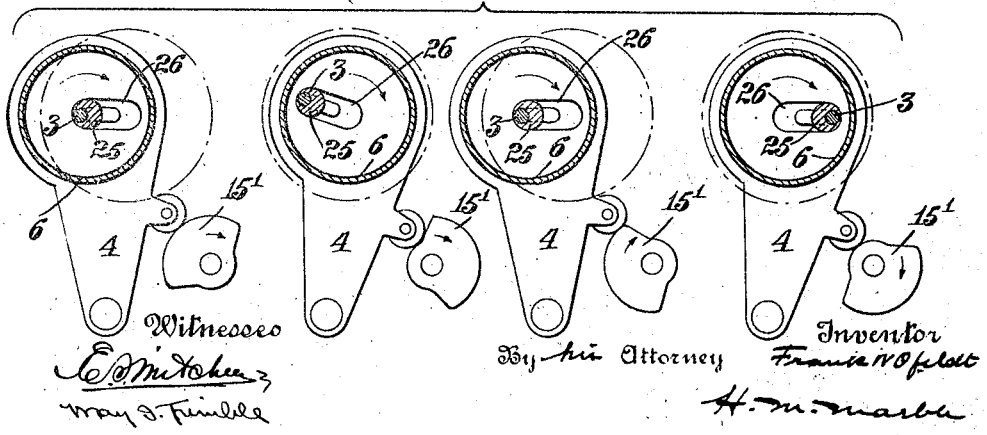
Fig. 2 is a diagrammatic view showing the valve operating mechanism in four different positions corresponding respectively to the four different positions of valves and engine pistons indicated directly above in Fig. 1.

In Fig. 2 I have shown, in sectional plan, the gears 6 in positions corresponding to the positions of the valves shown directly above in Fig. 1, and have shown corresponding positions of the various cams, designated in Fig. 2 by numerals 15'. For convenience of illustration in Fig. 2, the cams 15' there shown are not of the same type as the cams 15 shown in Fig. 3, but their effect is obviously the same. Comparison of Figs. 1 and 2 will show clearly why it is that the valves remain stationary during the compression and combustion periods of the engine.

As will be understood readily, the design of the cams 15 may be, and in practice will usually be, such as to permit each arm 4 to move so as to bring the corresponding crank pin 25 to the outer end of the slot 26, and so to cause opening of the exhaust port by that valve, slightly before the end of the working or combustion stroke in the corresponding cylinder. Of course lateral motion of any of the gears 6 with respect to its corresponding gear 8, causes a virtual slight rotation of such gear 6 with reference to its gear 8. The lateral motion of each gear 6 preparatory to the opening of the exhaust port, causes a virtual motion of that gear which is added to the actual rotation of that gear, which results in a very rapid exhaust port opening.

Since the valves $a$—$d$ are continually in contact each with the head of its corresponding cylinder, the ignition plugs 29 (Fig. 1) are preferably located in pockets 30 formed in the cylinder heads. Lubrication of each valve is effected conveniently by providing an oil duct 31 in each valve shaft 18, such duct extending through the corresponding crank arm to the corresponding valve stem 3. Oil so led to the valve stem will pass down along the valve stem to the upper surface of the valve itself and by the gyratory motion of that valve will be distributed over the entire surface of the valve and its seat in the cylinder head.

Figs. 7-10 illustrate an alternative construction. In these figures the valve-driving gear, here designated by numeral 6', is provided with a transverse track 32, which causes the valve, here designated by numeral $a'$, to gyrate, the stem 3' of the valve having mounted upon it a cross-head 32' adapted to permit the stem 3' to rotate within it, said cross-head adapted also to slide in the guide-way of track 32. This track is arched, as indicated particularly in Fig. 7. Above such track 32 is another track 34, circumferential as indicated particularly in Fig. 9, but the inner wall of which track 34 is not complete. A rotary gate 35 having a track 36 within it, intersects this track 34. The gate 35 is driven by screw gears 37 and 38 having a speed ratio of one to two, gear 38 being on a shaft 39 driven at half crank shaft speed by any suitable means, for example, the gears 40, 41, shaft 42 and gears 43 and 44 driven from the crank shaft of the engine. A tension spring 33' tends to hold the valve against its seat. The timing of the gears is such that the exhaust period occurs during passage of the valve stem 3' from $m$ (Fig. 8) counter clockwise through track 34 to $n$; that admission occurs during passage of such stem 3' counter clockwise through track 34 from $n$ to $m$; that stem 3', having just previously passed into the track 36 of gate 35 is then carried by such gate inward or toward the center of rotation, and is caused by such gate to travel through a circular path, during the compression and power strokes, of such smaller radius that the admission and exhaust ports are not opened by the valve during such compression and power strokes; Fig. 9 showing the stem 3' about to enter the track 36; and at about the conclusion of the power stroke the stem 3' passes out of the track 36 in gate 35 into track 34, the exhaust period then beginning, and the valve opening the exhaust port.

In the case of a multicylinder engine, and as indicated in Fig. 10, the gears 6' of successive cylinders mesh one with another, and therefore rotate in opposite directions; from which it follows that the screw gears 37 of adjacent cylinders, and also the screw gears 38 of adjacent cylinders, are of opposite pitch.

In Figs. 11 and 12 I illustrate a further alternative construction wherein the valve, here designated by numeral $a''$, is external to the cylinder, the cylinder having a combined inlet and exhaust port 45 and having an inlet duct 46 and an outlet duct 47, the valve having in it a port recess 48 adapted to register at one time with port 45 and inlet duct 46, and at another time with port 45 and exhaust duct 47, while at still other times the port recess 48 is not in registry with cylinder port 45 at all. The head of the cylinder is provided externally with a spherically curved recess 49 in which the valve gyrates; such gyratory motion being communicated to the valve, by a gear 6'' keyed to the rotary stem 50, this stem 50 being, in this case, a member separate from the valve itself and having a ball bearing 51 between it and the valve; the plane of the bearing being oblique to the axis of the stem 50. In fact, in many ways, the stem 50 and its bearing disk 52 corresponds to the crank arm 23 and shaft 18 of Fig. 4. A spring 53 holds the valve seated. Lubrication is provided by means of a duct 54 through the stem 50 terminating in a spout 55 near the rim of the valve recess 49 in the cylinder head. While the main motion of the valve $a''$ is a gyratory motion, it has a slight rotary motion for reasons above stated with reference to the construction shown in Figs. 1-6 inclusive. The shape of the ports of ducts 46 and 47, of the cylinder port 45, and of the valve port 48, is shown in Fig. 12, and consideration of this figure will make clear how it is that the various ports are placed in communication at proper times.

In Fig. 12 I have indicated diagrammatically the action of the valve shown in Fig. 11. The valve $a''$ is designated by a dash-and-dot circle, and its port 48 is designated by a similar but smaller dash-and-dot circle. Circle 56 is divided according to the various events in the cycle of a four cycle engine, 57 designating the point of exhaust opening and 58 the point of exhaust closure and also the point of inlet opening, while 59 designates the point of inlet closure; quadrant 60 corresponding to the compression stroke and quadrant 61 to the expansion or power stroke. In the semicircle 62, point 63 designates the beginning of exhaust, i. e., the point at which the valve port 48 begins to overlap cylinder port 45 while already overlapping exhaust port 47; the valve port 48 being shown as slightly beyond this point of exhaust opening. It will be seen that as port 48 travels over port 45, in the gyration of the valve, the exhaust opening will become gradually wider and then gradually narrower until, when port 48 ceases to lap exhaust port 47, exhaust closure will occur; after which the port 48 will begin to lap inlet port 46 while still lapping cylinder port 45, and the admission period will begin continuing until port 48 no longer laps inlet port 46. In the semi-circle 62, point 64 designates the point of exhaust closure and beginning of admission, and point 65 designates the end of the admission period.

While the valve gear shown in Figs. 11 and 12 is of general application, it is particularly suitable for high speed engines having cylinders with small bore. It will be noted that the area of the valve exposed to pressure at any time is very small. In the case of a four cycle engine, the angular speed of gear 6″ is of course one-half crank shaft speed.

In Fig. 13 I show a flat valve having a gyratory motion. The particular construction shown in this figure is especially intended for steam engines, or compressors, etc., but it will be apparent from such figure that a similar arrangement may be used for internal combustion engines. 66 designates the engine cylinder, 67 the head thereof having a flat valve seat, 68 designates the admission port and 69 the exhaust port. 70 is the flat valve which has the form of a disk, as shown particularly in Figs. 14 and 15. 71 designates a rotatably mounted bevel gear, to which the valve 70 is connected by an eccentric pin 72, and 73 designates a bevel gear upon a shaft 74 (which shaft may be supposed to be driven from the crank shaft of the engine, at crank shaft speed) for driving the gear 71 and valve 70. By comparison of Fig. 13 with Figs. 14 and 15, the operation of this valve gear will be obvious.

It is convenient, in the valve gear shown in Figs. 1 and 4, to hold the valve stationary during the compression and power strokes of the engine, as it permits the valve to be driven at crank shaft speed, and so permits larger port openings with quicker port opening and port closure. However, it is not necessary to so hold the valve stationary. In Fig. 16 I have shown a valve 75, similar in general construction to the valve shown in Figs. 1 and 4, but arranged to be driven at half crank shaft speed. 3 designates the valve stem, 76 a bevel gear with which that valve stem engages, 77 a spring tending to hold the valve against its seat, 78 a bevel gear of half the pitch diameter of gear 76, and intermeshing with said gear 76, and 79 a shaft for driving gear 78. It may be understood that shaft 79 is driven from the crank shaft of the engine at crank shaft speed. The admission port 27 and the exhaust 28, are set 90° apart. The operation of the valve gear will be obvious.

In Figs. 17 and 18 I illustrate a valve gear wherein means is provided for positively rotating the valve during its gyration, instead of depending upon friction for the rotation of the valve, as in the construction shown in Fig. 4, for example. 80 designates the valve, 3 its valve stem, 81 a bevel gear for gyrating the valve, 82 a driving bevel gear, and 83 a shaft for driving gear 82, which shaft 83 may be understood to be driven from the crank shaft of the engine at crank shaft speed; gear 81 being driven at half crank shaft speed. 77 designates a spring for holding the valve against its seat. Gear 81 is, in the construction shown, supported from the valve gear cover 84. It will be apparent that as gear 81 rotates the valve 80 will be caused to gyrate. That this valve may also be caused to rotate during its gyration, a stationary bevel gear 85 is provided, and the valve stem 3 carries a gear 86 meshing with the stationary gear 85. It will be apparent that as the valve gyrates it will also be caused to rotate.

In the construction shown in Figs. 17 and 18 the valve 80 overlaps the admission and exhaust ports 87 and 88 respectively, at all times; the valve being provided with port orifices 89 whereby, as the valve rotates during its gyration, the cylinder is connected at proper times to the admission port 87 and exhaust port 88. The number of these valve ports 89 depends upon the angular velocity of rotation of the valve with respect to its gyration; which, in turn, is dependent upon the relative pitch diameters of gears 85 and 86. In the particular construction shown the pitch diameter of gear 86 is two-thirds that of gear 85, and therefore the valve 80 is provided with three ports 89 as indicated in Fig. 18.

The admission and exhaust ports are located 90° apart and one valve port 89 serves first for exhaust and then for the ensuing admission period. When the next exhaust period occurs, the valve has been rotated so far that the next succeeding port 89 of the valve serves first for exhaust and thereafter for admission. In this way the several valve ports 89 are utilized in succession, the metal around each such port 89 being given opportunity to cool before it next comes into service.

In Fig. 19 I have indicated more or less diagrammatically an application of my gyratory valve for a steam engine, air compressor, etc.; the valve taking the place of the ordinary D valve. 90 designates the engine cylinder, 91 its piston, 92 the connecting rod, 93 the crank shaft, 94 the steam chest, 95 and 96 ports leading from such steam chest to the engine cylinder, 97 and 98 the exhaust ports, 99 the steam inlet to the steam chest, and 100 the gyratory valve, provided in its surface with a groove 101 which coacts on one side with port 95 and on the opposite side with port 96. The valve 100 is provided with a stem 3 and such valve is gyrated by an open center bevel gear 103 engaging the valve stem 3 as in previous figures; such gear 103 being driven by a bevel gear 104 and shaft 105 and other bevel gears 106 and 107 from the crank shaft of the engine.

Since an air compressor is, in principle, merely an ordinary steam engine worked backward, the structure illustrated in Fig. 19 is also in effect an air compressor, as well as a steam engine.

In the various valve gears herein described wherein a gyratory valve is used, the fact that the valve has, or may have, a rotary motion in addition to its gyratory motion, results in a permanent tight fit of the valve to its seat; for the motion imparted to the valve is just such a motion as tends to grind the valve into its seat, and just such a motion as would be used if the valve were being ground into its seat. In this respect my valve gear differs from all other valve gears of which I know, in other valve gears the action of the valve tending to create opportunity for leakage between the valve and its seat. Furthermore, in most other valve gears there is little or no opportunity for lubrication between the valve and its seat, whereas in my valve gears lubrication of the valve and its seat is easy, the lubricant is evenly distributed over the valve and its seat, and the lubricant between the valve and the seat in itself tends to prevent leakage. It will be appreciated that these are very important advantages of the improved gear. Furthermore, the fact that the valve never leaves its seat is a factor tending to insure quietness of operation, and the fact that the motion of the valve is, on the whole, slow relatively, and free from sudden acceleration and retardation, is another factor tending toward quietness of operation and durability.

In this description, the term "cylinder" meaning "engine cylinder" is used in its functional sense rather than in its geometric sense; for, as is well known, there are various types of engines particularly so-called rotary engines, wherein what correspond to the engine cylinders of an ordinary engine are not cylindrical in a geometric sense, though commonly termed cylinders nevertheless.

What I claim is:—

1. The combination with an engine cylinder having one or more ports, of a valve for such port or ports adapted for a gyratory motion, as distinguished from a rotary or oscillatory motion, and means for communicating such gyratory motion to said valve.

2. The combination with an engine cylinder having one or more ports, of a valve for such port or ports adapted for a gyratory motion, as distinguished from a rotary or oscillatory motion, and means for communicating such gyratory motion to said valve, said valve being also free to rotate.

3. The combination with an engine cylinder having one or more ports, of a valve for such port or ports adapted for a gyratory motion, as distinguished from a rotary or oscillatory motion, and means for communicating such gyratory motion to said valve, said valve being also free to rotate, and arranged to be rotated by reason of greater frictional resistance on one side of its axis than on the other side thereof.

4. The combination with an engine cylinder having a port or ports, of a gyrating valve for such port or ports.

5. The combination with an engine cylinder having in its head a recess of curvilinear cross-section and having a port or ports communicating with such recess, of a valve in such recess of a section corresponding to the section of the recess, and adapted for gyration in such recess, to coact with such port or ports, and means for imparting gyratory motion to such valve.

6. In an internal combustion engine having separate strokes for admission, compression, combustion and expansion, and exhaust, the combination of an engine cylinder having a port or ports, a gyratory valve for said port or ports, and operating means for such valve arranged to hold such valve substantially stationary during the compression and combustion and expansion strokes, and to cause such valve to function with respect to such port or ports during substantial portions of the admission and exhaust strokes.

7. The combination of an engine cylinder having a port or ports, a gyratory valve for such cylinder adapted for coaction with such port or ports, a rotary driving member engaging such valve and arranged to gyrate the same, and means for moving the point of engagement of such valve with said rotary member to substantially the center of rotation of such rotary member and back again.

8. The combination of an engine cylinder having a port or ports, a gyratory valve adapted for coaction with such port or ports and having a projecting stem, a rotary member having an approximately radial guide-way, an eccentric member movable in said guideway and having a guide opening through which the valve stem passes, means for rotating said rotary member, and means for moving such rotary member laterally to move the eccentric member, and with it the valve stem, in the said guideway of said rotary member.

9. The combination with an engine cylinder having a port or ports, a gyratory valve for such cylinder adapted for coaction with such port or ports and seated against the cylinder head, means for holding such valve against its seat, and means for operating the valve.

10. The combination with an engine cylinder having a port or ports, a gyratory valve for such cylinder adapted for coaction with such port or ports, spring means for holding such valve against its seat, and means for operating the valve.

11. The combination of an engine cylinder having a port or ports, a gyratory valve adapted for coaction with such port or ports, such valve seated in the head of said cylinder and having a projecting stem, a rotary member having an approximately radial guide-way, an eccentric member movable in said guide-way, and having a guide opening through which the valve stem passes, means for rotating said rotary member, means for moving such rotary member laterally to move the eccentric member and with it the valve stem in the said guide-way of said rotary member, and a spring acting upon said eccentric member and upon said valve stem, and tending to hold the valve seated.

12. The combination with an engine having a head with an open central portion, and having a port or ports, of a valve within said cylinder and seated against such head and adapted for gyration and thereby for coaction with such port or ports, such valve having a stem projecting through the open central portion of the head, and means engaging such stem for imparting gyratory motion to such valve.

13. The combination with an engine cylinder having a head with an open central portion, and having a port or ports, of a valve within said cylinder and seated against such head and adapted for gyration and thereby for coaction with such port or ports, such valve having a stem projecting through the open central portion of the head, and an open center rotary member into the open center of which said stem projects, said rotary member engaging said stem and adapted by its rotation to cause gyratory motion of the valve.

14. The combination with an engine cylinder having a head with an open central portion, and having a port or ports, of a valve within said cylinder and seated against such head and adapted for gyration and thereby for coaction with such port or ports, such valve having a stem projecting through the open central portion of the head, an open center rotary member having an approximately radial guide-way, an eccentric member located in said guide-way and having a guide opening through which the valve stem passes, means for rotating said rotary member, and means for moving such rotary member laterally to move the eccentric member, and with it the valve stem, toward and from the axis of rotation of said rotary member.

15. In an internal combustion engine having separate strokes for ignition compression combustion and expansion, and exhaust, the combination of an engine cylinder having a port or ports, a gyratory valve for such port or ports, an open center rotary member having an approximately radial guide-way, said valve having a stem passing through said guide-way, said rotary member adapted by its rotation to cause gyration of such valve, and means for moving said stem in said guide-way toward and from the axis of rotation of said rotary member.

16. In an internal combustion engine having separate strokes for ignition compression combustion and expansion, and exhaust, the combination of an engine cylinder having a port or ports, a gyratory valve for such port or ports, an open center rotary member having an approximately radial guide-way, said valve having a stem passing through said guide-way, said rotary member adapted by its rotation to cause gyration of such valve, and means for rotating said rotary member and also for moving said rotary member bodily to move said valve stem toward and from the axis of rotation of said rotatable member.

17. The combination with an engine cylinder having one or more ports, of a valve for such port or ports adapted for a gyratory motion, as distinguished from a rotary or oscillatory motion, and also adapted for a rotary motion, independent of such gyratory motion, and means for communicating such gyratory motion to said valve; the structure comprising means whereby as when said valve gyrates it also rotates.

18. The combination with an engine cylinder having a port or ports and having a seat for a gyratory valve, of a gyrating valve arranged to work against such seat and coact with such port or ports, and means for supplying lubricant to the coacting surfaces of such valve and seat.

19. The combination with an engine cylinder having a port or ports and having a seat for a gyratory valve, such seat having an open central portion, of a gyrating valve arranged to work against such seat and coact with such port or ports, and means for supplying lubricant to the coacting surfaces of such seat and valve through the open center of such seat.

20. The combination with an engine cylinder having a port or ports and having a seat for a gyratory valve, such seat having an open central portion, of a gyrating valve arranged to work against such seat and coact with such port or ports, and having a stem projecting through the said open center of such seat, a rotary member having a guide-way extending approximately to the center of rotation of such member, the said stem of such valve engaging such guide-way, and means for functionally moving the said stem through such guide-way toward and from the center of rotation of said rotary member.

21. The combination with an engine cylinder having a port or ports and having a seat for a gyratory valve, such seat having an open central portion, of a gyrating valve arranged to work against such seat and coact with such port or ports, and having a stem projecting through the said open center of such seat, a rotary member having a guide-way extending approximately to the center of rotation of such member, the said stem of such valve engaging such guide-way, and an eccentric member engaging such stem and arranged to move the same functionally toward and from the center of rotation of said rotary member.

22. The combination with an engine cylinder having a port or ports and having a seat for a gyratory valve, such seat having an open central portion, of a gyrating valve arranged to work against such seat and coact with such port or ports, and having a stem projecting through the said open center of such seat, a rotary member having a guide-way extending approximately to the center of rotation of such member, the said stem of such valve engaging such guide-way, and an eccentric member engaging such stem and arranged to move the same functionally toward and from the center of rotation of said rotary member, and having within it a lubricant duct extending to the said stem whereby lubricant may be supplied to the stem and thence to the coacting surfaces of the valve and seat.

23. The combination with an engine cylinder having a valve seat provided with a port or ports, of a gyratory valve adapted to gyrate against such seat and thereby to coact with such port or ports, a rotary member engaging such valve and adapted to impart gyratory motion thereto, said rotary member being movable laterally as well as rotatably, and a further rotary member provided with driving means for said first mentioned rotary member and provided also with means adapted to move such first mentioned rotary member laterally, and thereby to move its point of engagement with the valve functionally toward and from the center of rotation of such first mentioned rotary member.

24. The combination with an engine cylinder having a valve seat provided with a port or ports, of a gyratory valve adapted to gyrate against such seat and thereby to coact with such port or ports, a rotary member engaging such valve and adapted to impart gyratory motion thereto, said rotary member being movable laterally as well as rotatably, and a further rotary member provided with a gear engaging gear teeth of such first mentioned rotary member and thereby adapted to rotate such first mentioned rotary member, such further rotary member having also a cam adapted to move such first mentioned rotary member laterally and thereby to shift functionally the point of engagement of such valve and such first mentioned rotary member toward and from the center of rotation of such first mentioned rotary member.

25. In a multi-cylinder engine, the combination with a plurality of engine cylinders each having a head provided with a valve seat and with a port or ports, and each having a gyratory valve adapted to gyrate on such seat and thereby to coact with such port or ports, of a rotary member for each such cylinder engaging the corresponding valve and adapted to gyrate the same, and a valve shaft common to such cylinders and provided with gears engaging gear teeth of the said rotary members and adapted to rotate the same.

26. In a multi-cylinder engine, the combination with a plurality of engine cylinders each having a head provided with a valve seat and with a port or ports, and each having a gyratory valve adapted to gyrate on such seat and thereby to coact with such port or ports, of a rotary member for each such cylinder engaging the corresponding valve and adapted to gyrate the same, and a valve shaft common to such cylinders and provided with gears engaging gear teeth of the said rotary members and adapted to rotate the same, the valve structures comprising means whereby the point of engagement of each valve with its corresponding rotary member may be shifted functionally toward and from the center of rotation of such rotary member, the said common shaft provided with means adapted for so shifting such points of engagement.

27. In a multi-cylinder engine, the combination with a plurality of engine cylinders each having a head provided with a valve seat and with a port or ports, and each having a gyratory valve adapted to gyrate on such seat and thereby to coact with such port or ports, of a rotary member for each such cylinder engaging the corresponding valve and adapted to gyrate the same, and a valve shaft common to such cylinders and provided with gears engaging gear teeth of the said rotary members and adapted to rotate the same, the valve structures comprising means whereby the point of engagement of each valve with its corresponding rotary member may be shifted functionally toward and from the center of rotation of such rotary member, the said common shaft provided with cam means adapted for so shifting such points of engagement.

28. The combination with an engine cylinder provided with a valve seat and with a port or ports in such valve seat, and a gyratory valve adapted to gyrate with respect to such seat and thereby to coact with such port or ports, of a gear member functionally engaging such valve, a swinging arm on which such gear member is mounted for rotation and also for lateral movement with said arm, such gear member functionally engaging said valve to gyrate the same and also to cause such valve functionally to move toward and from the center of rotation of such gear member as the latter moves laterally, a shaft having a gear arranged to rotate such gear member and to maintain engagement therewith during the lateral movement thereof, said shaft having also means for moving the said arm and gear member laterally.

29. The combination with an engine cylinder provided with a valve seat and with a port or ports in such valve seat, and a gyratory valve adapted to gyrate with respect to such seat and thereby to coact with such port or ports, of a gear member functionally engaging such valve, a swinging arm on which such gear member is mounted for rotation and also for lateral movement with said arm, such gear member functionally engaging said valve to gyrate the same and also to cause such valve functionally to move toward and from the center of rotation of such gear member as the latter moves laterally, a shaft having a gear arranged to rotate such gear member and to maintain engagement therewith during the lateral movement thereof, said shaft having also means for moving the said arm and gear member laterally in one direction, and spring means tending to return such arm and gear member when permitted by said cam.

30. The combination in a four cycle engine with an engine cylinder having a valve seat provided with a port or ports, of a gyratory valve adapted to gyrate against such seat and thereby to coact with such port or ports, a rotary spiral gear engaging such valve and adapted to impart gyratory motion thereto, said gear being movable laterally as well as rotatably, a further spiral gear engaging such first mentioned gear and adapted to rotate it, said two spiral gears adapted to maintain mesh during lateral motion of the first mentioned gear, and means which moves said first mentioned gear laterally at about the end of the admission stroke until the point of engagement of the valve with said first mentioned gear is at or near the center of rotation of such gear, whereby the valve remains functionally inactive during the compression and power strokes, said gear moving means arranged to return said first mentioned gear laterally near the end of the power stroke so as to move the point of engagement of said gear and valve away from the axis of rotation of the gear, whereby the valve becomes functionally active again, the virtual motion of said first mentioned gear with reference to its driving gear during such return lateral motion of the first mentioned gear resulting in quick exhaust opening.

31. The combination with an engine cylinder having a valve seat in which is one or more ports, of a valve for such port or ports adapted for a gyratory motion, and operating means for such valve comprising means for drawing said valve toward its seat.

32. The combination with an engine cylinder having a valve seat in which is one or more ports, of a valve for such port or ports adapted for a gyratory motion, and operating means for such valve arranged to permit slight motion of said valve toward and from its seat and comprising means for drawing said valve toward its seat.

In testimony whereof I have signed this specification in the presence of two subscribing witnesses.

FRANK W. OFELDT.

Witnesses:
H. M. MARBLE,
PAUL H. FRANKE.